US005438754A

United States Patent [19]

Mori

[11] Patent Number: 5,438,754

[45] Date of Patent: Aug. 8, 1995

[54] METHOD OF MAKING A VALVE LIFTER FOR ENGINE

[75] Inventor: Kazuaki Mori, Iwata, Japan

[73] Assignee: Yamaha Hatsudoki Kabushiki Kaisha, Iwata, Japan

[21] Appl. No.: 92,559

[22] Filed: Jul. 16, 1993

Related U.S. Application Data

[62] Division of Ser. No. 870,598, Apr. 17, 1992, Pat. No. 5,251,587.

[30] Foreign Application Priority Data

Apr. 17, 1991 [JP] Japan .................................. 3-113991

[51] Int. Cl.⁶ ............................................... B23P 15/00

[52] U.S. Cl. ............................... 29/888.43; 29/888.46; 29/523

[58] Field of Search ................ 29/888.43, 888.46, 523; 123/90.48, 90.51, 90.52; 74/569

[56] References Cited

U.S. PATENT DOCUMENTS

| | | |
|---|---|---|
| 2,891,525 | 6/1959 | Moore . |
| 4,430,970 | 2/1984 | Holtzberg et al. . |
| 4,829,950 | 5/1989 | Kanamuru et al. . |
| 4,909,198 | 3/1990 | Shiraya et al. . |
| 5,003,940 | 4/1991 | Hixson . |

FOREIGN PATENT DOCUMENTS

| | | |
|---|---|---|
| 62-63105 | 3/1987 | Japan . |
| 62-255507 | 11/1987 | Japan . |
| 63-75030 | 4/1988 | Japan . |
| 63-147907 | 6/1988 | Japan . |
| 2040008 | 2/1990 | Japan . |
| 2-169143 | 4/1990 | Japan . |

*Primary Examiner*—Irene Cuda

*Attorney, Agent, or Firm*—Knobbe, Martens, Olson & Bear

[57] ABSTRACT

Tappet assemblies of a main body element are formed from a lightweight material and an engaging element adapted to engage the valve stem and formed from a harder, more wear resistant element. The engaging element and the main body element have cooperating cylindrical surfaces with a discontinuity in one of these surfaces into which the material of the other element is plastically deformed on assembly for locking the elements to each other.

8 Claims, 12 Drawing Sheets

METHOD OF MAKING A VALVE LIFTER FOR ENGINE

This is a division of U.S. patent application Ser. No. 07/870,598, filed Apr. 17, 1992, now U.S. Pat. No. 5,251,587.

BACKGROUND OF THE INVENTION

This invention relates to a valve lifter for an engine and more particularly to an improved valve lifter and method of manufacturing such a valve lifter.

A wide variety of types of valve lifters are employed in the valve actuating mechanism for internal combustion engines. Such lifters generally are cylindrical elements that are mounted for reciprocation within a bore in a component of the engine and are contacted at one end either by the cam lobe or a member actuated by the cam lobe and at their other end contact either the tip of the valve stem or another element that cooperates with the valve to open it. As is well known, it is very desirable to maintain a low weight in the reciprocating masses of the valve train so as to permit high speed operation and higher performance. Therefore, it is desirable to ensure that such valve lifters are formed from a lightweight material, such as aluminum, magnesium or titanium.

However, many of the lightweight materials and particularly those named do not have a good wear resistance. Either or both contact ends of the valve lifter are subject to wear and if these elements wear too rapidly then frequent lash adjustment is required to maintain the appropriate clearances in the valve system and to avoid noise.

One commonly used type of valve lifter employed with overhead camshaft engines consists of a thimble tappet which has a generally cylindrical configuration and is supported within a bore in the cylinder head assembly. The head of the tappet is engaged either by a cam or rocker arm actuated by a cam for reciprocating the tappet. The tappet has an internal surface that is engaged with the tip of the valve for transmitting this reciprocating motion to the valve. Normally, an adjusting shim is positioned between the head of the tappet and the cam. As with the general type of lifter problems mentioned above, this type of tappet also can be subject to wear in the area where the tappet engages the valve stem due to the high unit loadings.

It has been proposed to employ lightweight tappet bodies for this purpose and insert a form of hardened wear-resistant element between the tappet body and the valve stem. However, if this hardened element is not fixed rigidly relative to the tappet body, then relative motion can occur which will cause wear of the tappet body, noise and variations in clearance.

It has been proposed to employ a non-circular hardened element that is received in a non-circular recess formed in the tappet body so as to hold the hardened element and tappet body together and against rotation. However, such constructions have a number of disadvantages.

Specifically, it is difficult to form non-circular recesses in the tappet body. In addition, to form the non-circular hardened insert, a stamping process is frequently employed. However, as is well known with stamping or punching operations, the thin material that is being punched will tend to be deformed at the peripheral edges so that a flattened surface does not result. Thus, either the insert must be subsequently machined to bring the surface flat or the insert will tend to flatten out in operation and the clearances change with the aforenoted problems.

Furthermore, it is difficult to machine the recess in the tappet body to have a sharp edge at the base of the opening that receives the insert. Hence, this type of construction is not particularly advantageous.

It is, therefore, a principal object of this invention to provide an improved valve lifter that can be made from a composite material in a low cost method and which will have the hardened insert be rigidly held in place throughout the whole life of the tappet to avoid wear.

It is a further object of this invention to provide an improved valve lifter made of a composite material wherein the hardened insert can be easily interlocked into the tappet body and wherein circular surfaces may be employed to avoid the aforenoted defects.

It is a still further object of this invention to provide an improved tappet construction for an engine and method of manufacturing it which permits light weight and long life.

SUMMARY OF THE INVENTION

This invention is adapted to be embodied in a tappet assembly for transmitting motion between an actuating member and a valve stem member in a reciprocating machine. The tappet assembly is comprised of a main body element having a cylindrical surface adapted to be supported for reciprocation in a bore of a component of the machine. An engaging element is also provided. The engaging element and the main body element have cooperating interengaging cylindrical surfaces. At least one of the elements is formed with a discontinuity in its cylindrical surface with the other of the elements has a portion thereof which is plastically deformed to extend into the surface discontinuity upon assembly of the elements for interlocking the elements together.

Another feature of the invention is adapted to be embodied in a method of manufacturing a tappet assembly for transmitting motion between an actuating member and a valve stem member in a reciprocating machine. The method comprises the steps of forming a main body element having a first cylindrical surface adapted to be supported for reciprocation in a bore in a component of the machine. An engaging element is also formed. The engaging element and the main body element are both formed with cooperating cylindrical surfaces that are adapted to be interengaged. At least one of the elements is formed with a discontinuity in its cylindrical surface. The elements are assembled together and the other element is plastically deformed to extend at least in part into the surface discontinuity of the one element to interlock the elements to each other.

BRIEF DESCRIPTION OF THE DRAWINGS

FIGS. 10–13 are enlarged cross-sectional views of the area encompassed by the circle 10 in FIG. 9 and shows how the interlocking is achieved.

FURTHER DESCRIPTION OF THE PRIOR ART

Figure 1:
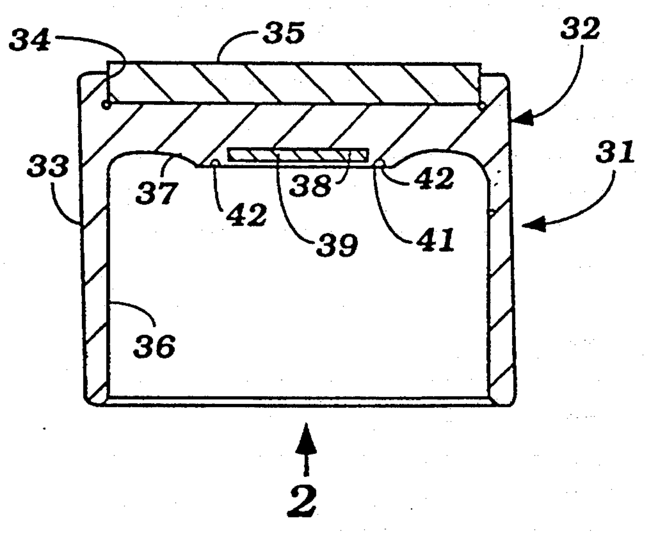
Figure 1 Prior Art
FIG. 1 is an enlarged cross-sectional view taken through a tappet constructed in accordance with a prior art type of arrangement.
Figure 2:
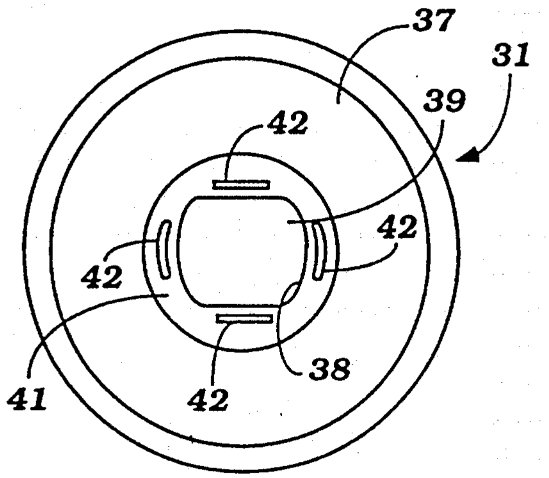
Figure 2 Prior Art
FIG. 2 is a bottom plan view of the prior art tappet taken in the direction of the arrow 2 in FIG. 1.

The aforenoted problems in conjunction with the manufacturing of prior art type of lightweight valve actuating tappets may be further understood by reference to FIG. 1–4 which show a prior art type of tappet, indicated generally by the reference numeral 31. The tappet 31 includes a main body portion, indicated generally by the reference numeral 32, which is formed from a lightweight material such as aluminum, aluminum alloy, magnesium, magnesium alloys or titanium. The tappet body 32 has a cylindrical outer surface 33 that is slidably received in a bore of a component of the engine. The head of the tappet body 32 is formed with a cylindrical recess 34 into which a hardened adjusting shim 35 is positioned. The adjusting shim 35 is contacted either directly by the cam lobe, by a rocker arm or by some other element actuated by the cam lobe for reciprocating the tappet 32 in its bore. The hardened shim 35 may be replaced to adjust lash in the valve train, as is well known.

A skirt portion 36 depends from a transverse wall 37 that forms the lower boundary of the cylindrical recess 34. An insert receiving opening 38 is formed in the lower surface of the wall 37 and is adapted to receive a hardened insert 39 that engages the stem of the associated poppet valve (not shown in these figures). Although circular inserts might be employed and are in some embodiments, the use of circular inserts with the prior art type of constructions have some disadvantages. That is, although the circular insert may be locked in place, in a manner which will be described, the cylindrical surfaces formed between the insert and the tappet body permit the insert to loosen and rotate which will cause wear, change lash and generate noise.

Figure 3:
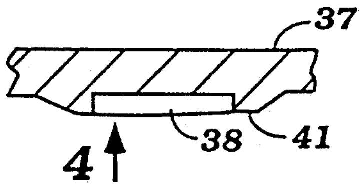
Figure 3 Prior Art
FIG. 3 is a further enlarged cross-sectional view showing how the tappet body and opening for receiving the hardened insert is formed.
Figure 4:
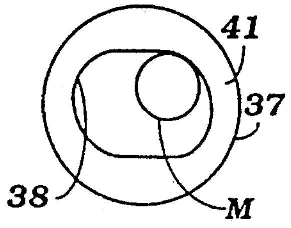
Figure 4 Prior Art
FIG. 4 is a view taken in the direction of the arrow 4 in FIG. 3 and shows how the hardened body receiving recess is formed in accordance with a prior art method.

In accordance with some form of prior art type of constructions, therefore, the recess 38 is formed with a non-circular shape such as an oval or elliptical configuration by a machining operation as best seen in FIGS. 3 and 4. To achieve this a machining tool M such as formed on an end mill, machines an oval or elliptical recess 38 as may be clearly seen. This recess is surrounded by a raised area 41.

A corresponding shaped hardened insert 39 is then inserted into the recess 38 and the raised area 41 around the recess 38 is upset by a punch or the like in the areas 42 so as to cause plastic deformation of the upstanding area 41 into interlocking relationship with the insert 39. As a result, the insert 39 will be held in place and because of the shape of the recess 38 and the insert piece 39, rotation will not occur.

It should also be noted and has been aforedescribed, that the insert piece 39 is normally formed by a stamping and this will cause some deformation of the metal around the edges of the stamping by the punching tool which, will present problems are aforenoted. That is, these edges will become peened down as the element wears and will open up a clearance that can cause noise and wear. Also it is difficult to maintain a sharp right angle corner at the base of the recess 38.

DETAILED DESCRIPTION OF THE PREFERRED EMBODIMENTS OF THE INVENTION

Figure 5:
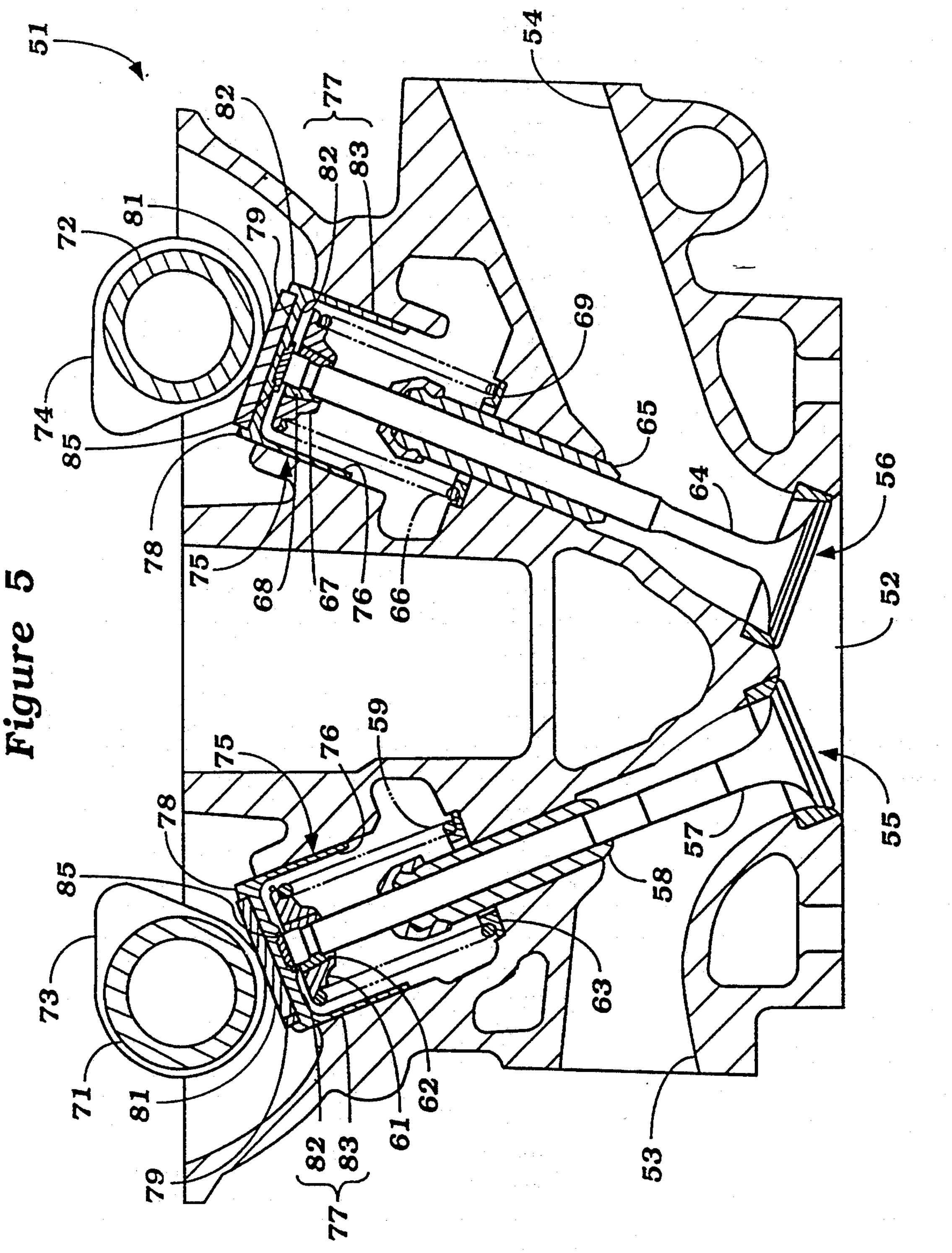
FIG. 5 is an enlarged cross-sectional view taken through a cylinder head of an internal combustion engine having tappet bodies constructed in accordance with a first embodiment of the invention.

Referring to the embodiment of FIG. 5–14 and initially to FIG. 5, a portion of a cylinder head embodying tappets constructed in accordance with an embodiment of the invention is identified generally by the reference numeral 51. The cylinder head 51 is adapted to be affixed to a cylinder block assembly (not shown) and has a plurality of recesses 52 formed in its lower face each of which forms a portion of a respective combustion chamber with a cylinder of the cylinder block and a piston which reciprocates therein.

Exhuast passages 53 extend through one side of the cylinder head 51 and cooperate with the recesses 52 while intake passages 54 extend from the recesses 53 through the other side of the cylinder head. Exhaust and intake valves 55 and 56 are slidably supported in the cylinder head assembly 51 in a manner to be described, and control the communication of the exhaust and intake passages 53 and 54 with the recesses 52.

The exhaust valves 55 have valve stems 57 that are slidably supported in valve guides 58 that are pressed or otherwise secured into the cylinder head assembly 51. A coil compression spring 59 encircles the upper end of the valve stems 57 and acts against a spring retainer 61 that is held to the valve stem 57 by a retainer assembly 62. The lower ends of the valve springs 59 bear against wear plates 63 that are engaged with the cylinder head 59 so as to urge the exhaust valves 55 to their closed positions.

In a similar manner, the intake valves 56 have stem portions 64 that are reciprocally supported in valve guide 65 pressed into the cylinder head assembly 51. Coil compression springs 66 engage spring retainers 67 held to the valve stems 64 by keepers 68. The opposite ends of the springs 66 engage wear plate 69 that bears against the cylinder head 51 for urging the intake valves 64 to their closed positions. The exhaust valves 55 and intake valves 56 are operated by means of overhead mounted exhaust and intake camshafts 71 and 72, respectively. The camshafts 71 and 72 are journaled in a known manner in the cylinder head assembly 51 and have individual cam lobes 73 and 74 that actuate the exhaust and intake valves 55 and 56, respectively through thimble tappets, indicated generally by the reference numeral 75 and which have a construction as which will be best described in conjunction with FIGS. 6–13. Before turning to these figures, however, it should be noted that the cylinder head 51 is formed with respective bores 76 that slidably support the thimble tappets 75 for their motion.

Figure 6:
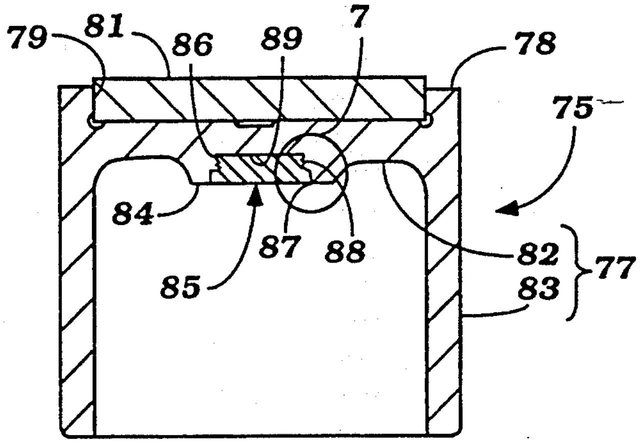
FIG. 6 is an enlarged cross-sectional view taken through the tappet body of this embodiment.
Figure 7:
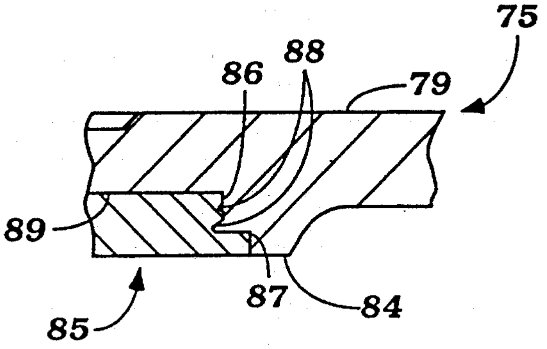
FIG. 7 is a still further enlarged view of the portion of the tappet body encompassed by the circle 7 in FIG. 6.
Figure 8:
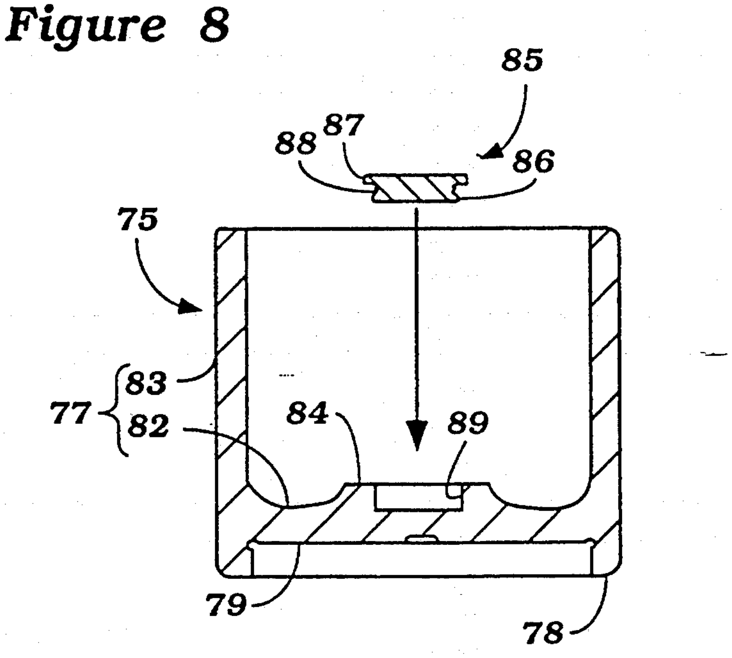
FIG. 8 is a cross-sectional view showing how the hardened insert is inserted into the tappet body.
Figure 9:
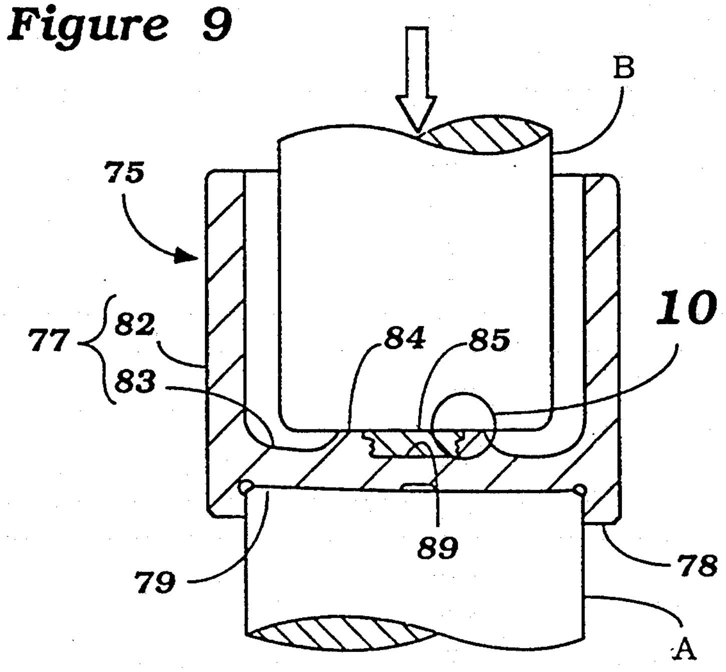
FIG. 9 is a cross-sectional view showing the process by which the hardened insert is interlocked into the tappet body.

Referring now in detail to the remaining figures of this embodiment and initially to FIGS. 6 and 7, it should be noted that each tappet 75 is comprised of a main body element 77 which is formed from a lightweight material such as aluminum, aluminum alloys, magnesium, magnesium alloys or titanium. Such materials have great utility due to their light weight. The tappet body 77 is formed with an upstanding portion 78 in which a cylindrical recess 79 is formed so as to receive a hardened adjusting shim 81.

The lower edge of the recess 79 is defined by an internal wall 82 and a skirt portion 83 depends from this wall. The portions 78 and 83 have their cylindrical outer surfaces treated with a hardened layer for wear resistance which may be formed by depositing molybdenum disulfide on a hardened chrome plated or anodized process porous layer for reducing friction and resisting galling during reciprocation of the tappets 75 in the cylinder head bores 76.

A raised portion 84 is formed at the center of the lower portion of the wall 82 and receives a hardened insert element 85 that is adapted to engage the valve stem 57 and particularly its upper tip. The insert element 85 is formed from a suitable material that has high strength and low wear resistance such as steel or the like.

The element 85 has a generally cylindrical outer surface portion 86 which, due to its cylindrical configuration, can be easily machined or formed on conventional equipment. A pressing portion 87 is formed at the lower extremity of the cylindrical portion 86 and also is cylindrical in configuration but is larger in diameter, for a reason which will become apparent. In accordance with an important feature of the invention, the cylindrical surface portion 86 of the element 85 is formed with a plurality of surface discontinuities such as circumferential grooves 88 which may be easily formed by a turning operation.

A recess is formed in raised portion 84 of the body element 77 by a boring operation and this recess is indicated by the reference numeral 89. The way in which the hardened element 85 is locked into the recess 89 and interlocked with the body element 78 will now be described by particular reference to FIG. 8–13.

Figure 10:
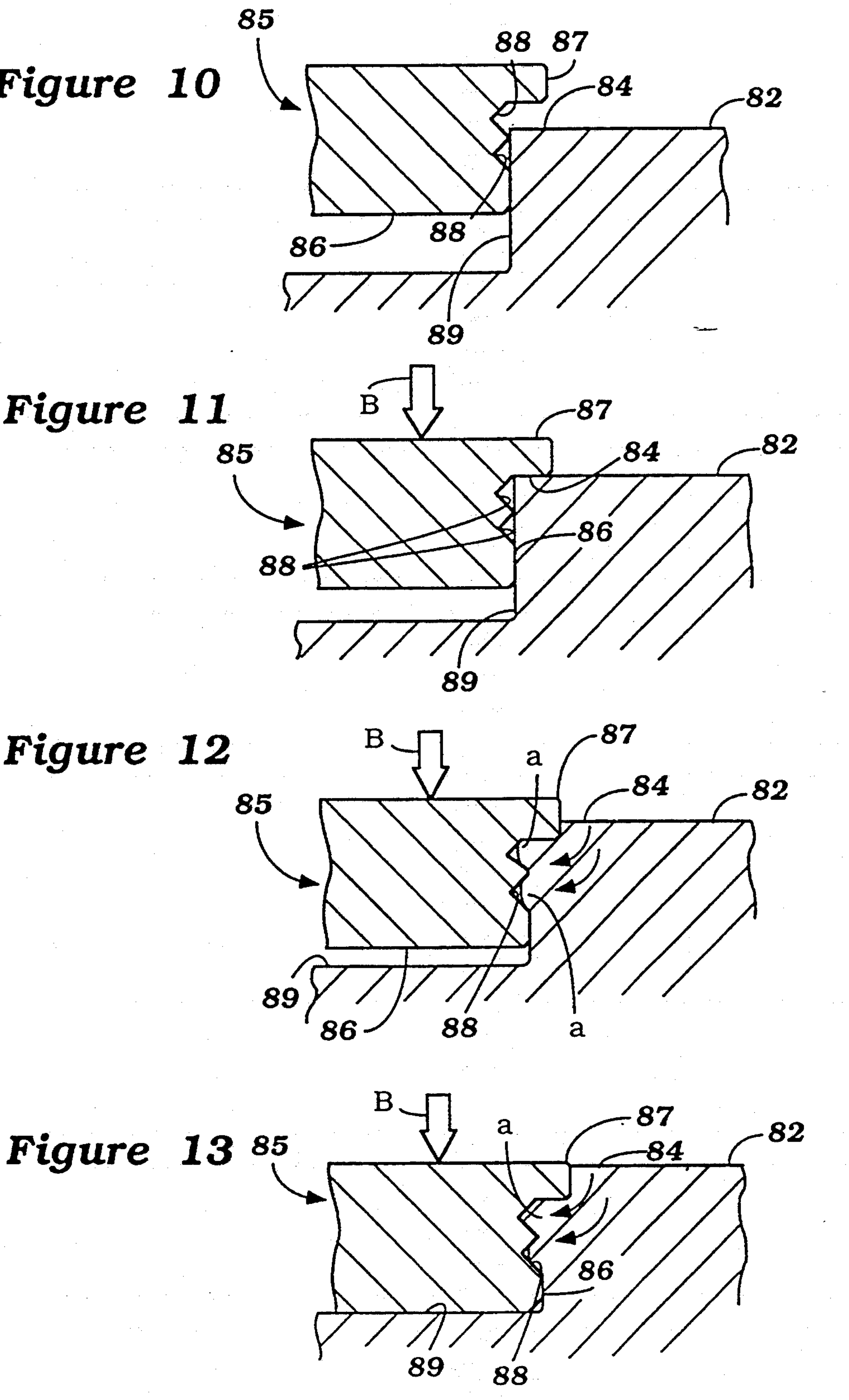

The body element 78 and insert element 85 are first formed including the formation of the cylindrical bore 89 in the wall raised portion 84 of the body element 77 and the surface discontinuities 88 are formed on the external portion of the insert element 85. As may be seen in FIG. 9, originally the bore 89 is a blind bore and its diameter is complementary to the diameter of the element cylindrical portion 86 so that these surfaces will be in close engagement when the insert element 85 is first placed in the bore 79 as shown in FIG. 10. There will be some interference and the insert element 85 upon initial installation will not bottom out in the bore 89 as clearly shown in FIG. 10.

When this initial assembly operation has been completed, the tappet 75 is inserted onto a mandrel A that is complementary to the recess 79 that normally receives the adjusting shim 81 and a press punch B is brought downwardly into engagement with first the insert 85 and specifically its pressing portion 87. The press B then moves downwardly to complete the driving of the cylindrical portion 86 into the bore 89 until the pressing portion 87 engages the raised portion 84 of the body element wall 82 (FIG. 11).

The pressing operation is then continued and the pressing portion 87 of the insert element 85 will plastically deform the material of the body element 77 so as to cause it to be deformed as shown at "a" into the surface discontinuities or grooves 88. This operation continues until the insert element 85 is bottomed out in the bore 89 as seen in FIG. 3. At this time, the surface of the insert element pressing portion 87 will be substantially aligned with the lower surface of the wall raised portion 84 and sufficient material "a" will be deformed into the recesses 88 so as to provide a rigid interlock that will not become disassembled. At the same time, this interlock will be sufficient to ensure against any possibility of rotation of the insert element 85 relative to the body element 77. This antirotation feature can be further strengthened by having the surface discontinuities 88 not be completely continuous around the surface, although this is not necessary.

Figure 14:
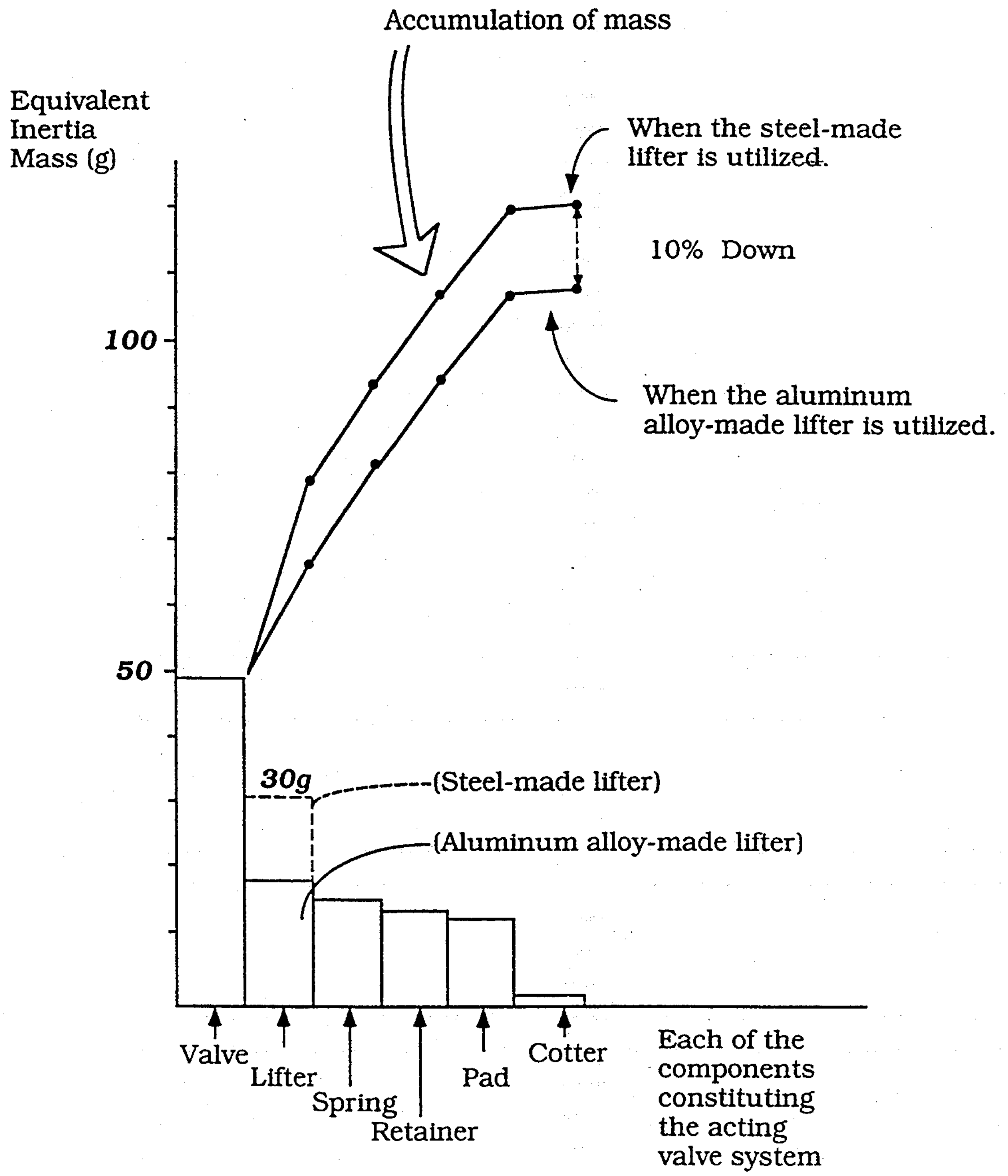
FIG. 14 is a graphical view showing the way in which the weight of the tappet body and entire valve mechanism can be reduced by practicing the invention.

FIG. 14 shows how this type of construction results in substantial lightening not only of the tappet element 75 but the complete valve train. FIG. 14 shows the individual masses of the various elements of the valve train and the equivalent inertial mass of the system. The blocks at the bottom of the figure indicate the individual masses of the elements while the curves at the top show the effective accumulation of inertial mass. As may be seen, a tappet of the configuration shown in the figures and identified by the reference numeral 75 if made completely of hardened steel would have a weight of about 30 grams. However, by reducing the weight of the lifter by using the construction as shown in FIGS. 5–13, the weight can be reduced by 40 percent and this provides a ten percent reduction in weight of the overall valve actuating system. This obviously translates to higher possible engine speeds and higher outputs without any loss of life.

Figure 15:
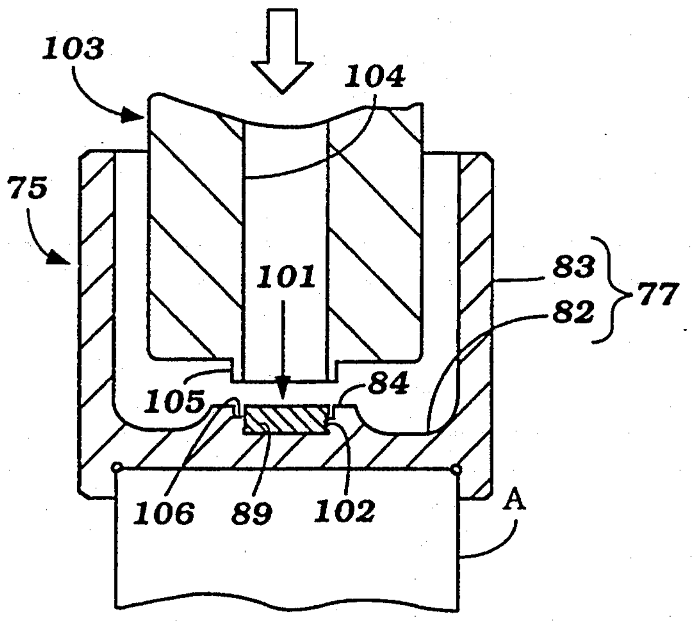
FIG. 15 is an enlarged cross-sectional view, in part similar to FIG. 9, and shows another embodiment of the invention.

In the embodiment of the invention as thus far described, the insert piece 85 had an integral pressing portion and hence it was possible to employ a plain punch tool B for upsetting the material of the tappet element 77 into interlocking relationship with the insert element 85. FIG. 15 shows another embodiment of the invention wherein the insert element, indicated generally by the reference numeral 101, has merely a cylindrical disc type configuration with a uniform diameter.

Surface discontinuities 102 are formed in the lower portion of the insert element 101, again by a turning operation such as may achieved on a lathe or the like. In this embodiment, a punching tool, indicated generally by the reference numeral 103, is employed which has a central bore 104 to provide a clearance around the periphery of the insert element 101. A raised ridge 105 extends around the bore 104 and will engage a peripheral portion 106 of the raised portion 84 of the tappet body element 77 upon the punching operation so as to upset the material of the body element 77 into the discontinuities 102 to achieve the interlocking operation.

Figure 16:
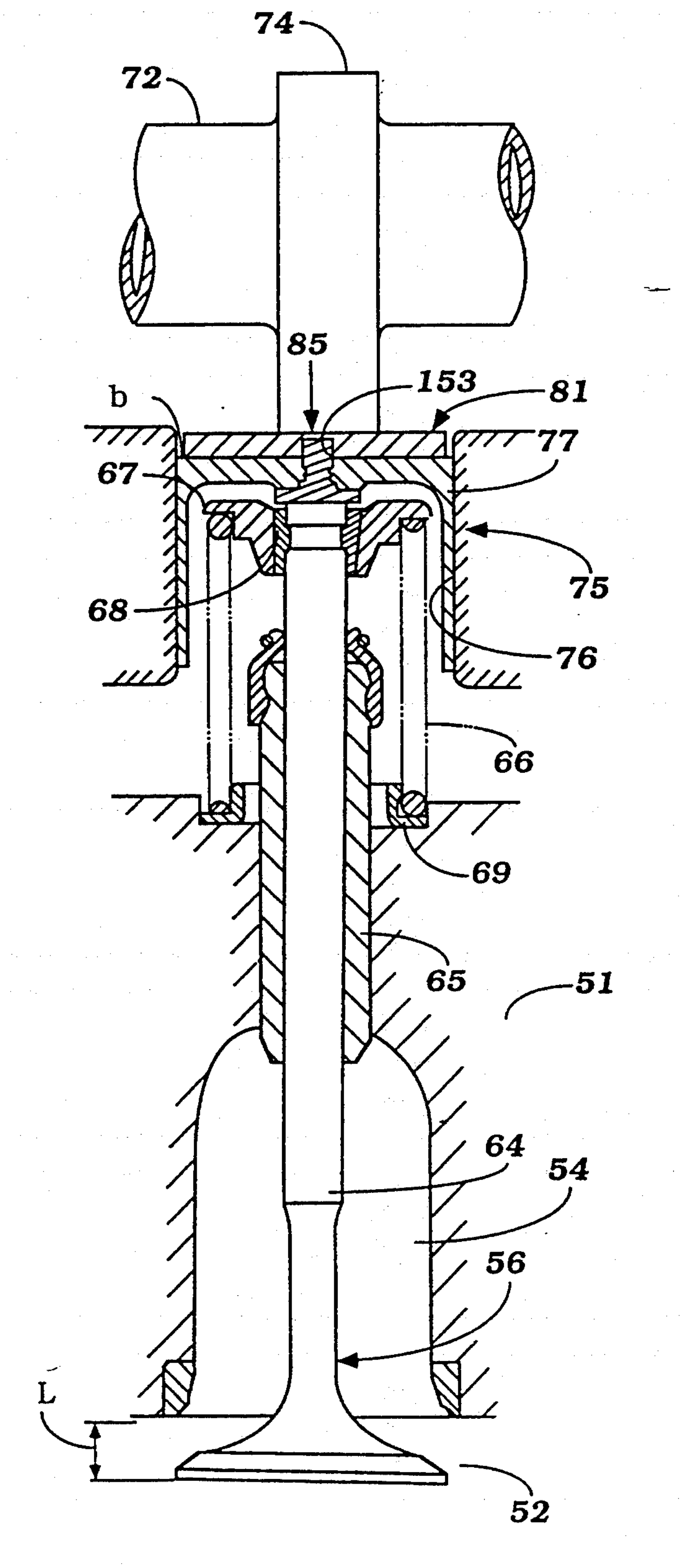
FIG. 16 is a cross-sectional view taken through the valve train of an engine along a plane perpendicular to the plane of FIG. 5 and shows a further embodiment of the invention.
Figure 17:
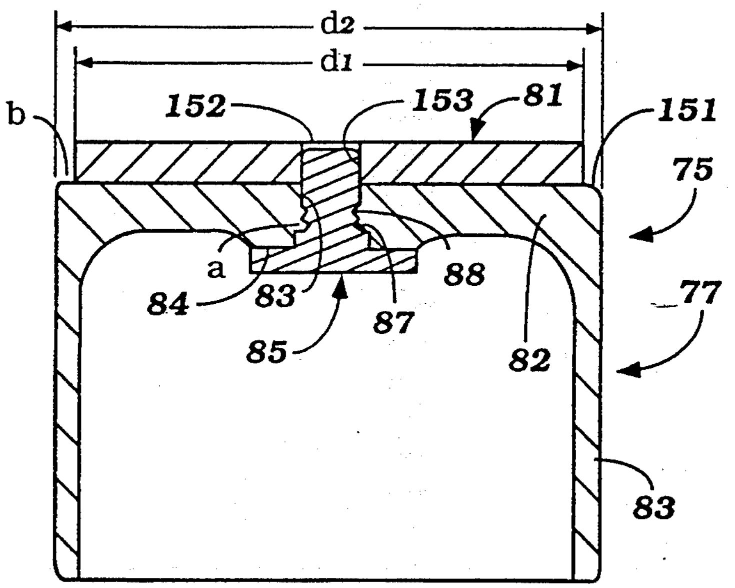
FIG. 17 is a further enlarged cross-sectional view of the tappet of this embodiment.

In the embodiments of the invention as thus far described, the upper portion of the tappet body element 77 has been formed with a conventional cylindrical recess 79 for receiving the adjusting shims 81. Of course, this type of construction requires a further forming step for the head of the tappet body element 77. The remaining figures show embodiments of the invention wherein such a recess is not required but wherein the hardened insert element is formed with a projection or post that cooperates with the adjusting shims to hold them against transverse movement on the top of the tappet body element. The first of these embodiments is shown in FIGS. 16–18 and components of the engine or tappet which are the same as those previously described have been identified by the same reference numerals and will not be described again, except insofar as is necessary to understand the construction and operation of this embodiment.

As may be seen in the Figures, the tappet 75 and specifically its body element 77 is generally the same as those of the previously described embodiments except for the absence of the recess 79 formed by the upstanding ridge 78 that receives the adjusting shims 81. In this embodiment, the tappet body element on the upper surface of the wall 82 is formed with a planar surface 151 upon which the adjusting shim 81 rests.

The hardened insert element 85 has a construction as described in the embodiment of FIGS. 5–14 but the opening 89 in the wall 82 extends completely through it and the hardened insert 85 has an extending cylindrical portion 152 that extends above the upper wall 151. The adjusting shim 81 is formed with a bore 153 that is complementary to the diameter of the extending portion 152 and when received thereon, the shim 81 will be held against transverse movement. It should be noted from the figures that the diameter $d_2$ of the cylindrical outer surface 83 of the tappet body element 77 is greater than the diameter $d_1$ of the adjusting shim 81 so as to provide a gap b around the peripheral edge.

Figure 18:
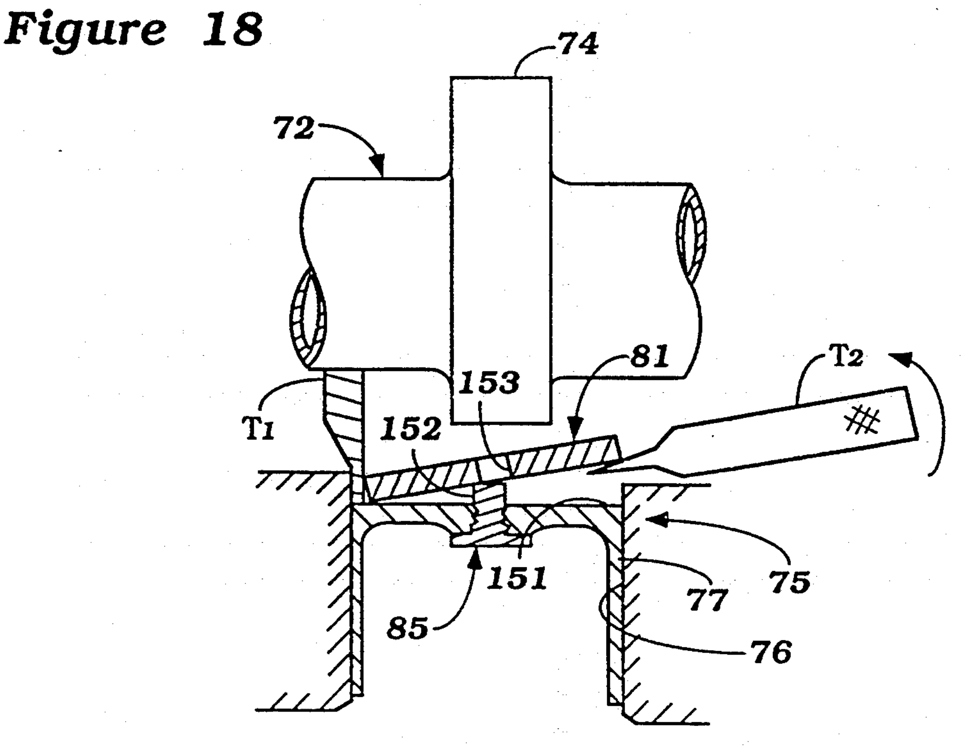
FIG. 18 is a cross-sectional view, in part similar to FIG. 16, and shows how the adjusting shim can be changed in this embodiment.

As may be seen in FIG. 18, to provide adjustment of the lash between the cam lobe 74 and the tappet 75, a tool $T_1$ is inserted between the camshaft 72 and the gap b to force the tappet 75 downwardly and open a clearance between the heel of the cam lobe 75 and the adjusting shim 81 to permit the insertion of a further tool $T_2$ so as to permit the shim 81 to be removed for replacement and lash adjustment in a manner which should be obvious to those skilled in the art.

Figure 19:
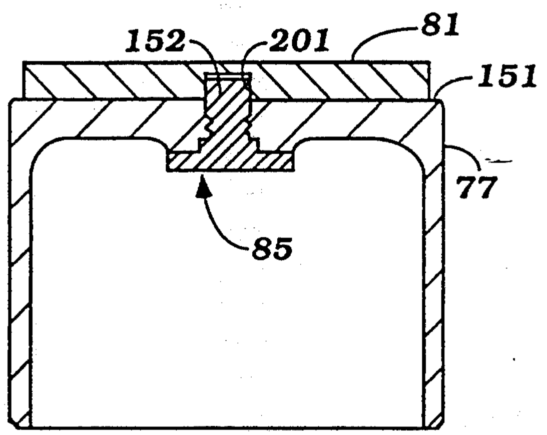
FIG. 19 is an enlarged cross-sectional view, in part similar to FIG. 17, and shows another embodiment of the invention.

FIG. 19 shows another embodiment of the invention which differs from the embodiment of FIGS. 16–18 only in that the adjusting shim 81 rather than having a through hole is formed with a blind bore 201 in which a shorter post extension 152 of the hardened insert element 85 extends so as to provide for the retention of the adjusting shim 81 relative to the tappet body element 77. In this way, the cam lobe will contact a completely continuous surface during its rotation.

Figure 20:
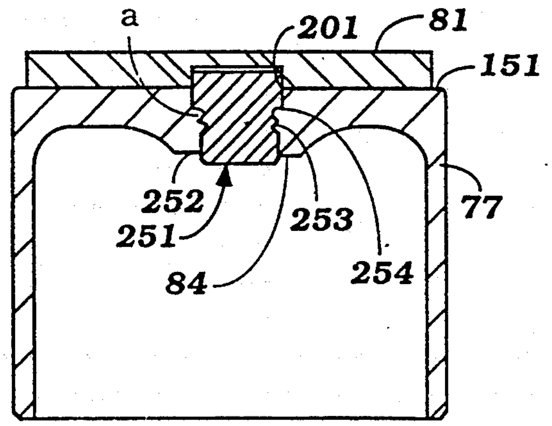
FIG. 20 is a cross-sectional view, in part similar to FIGS. 17 and 19, and shows a still further embodiment of the invention.

FIG. 20 shows another embodiment of the invention which retains the adjusting shim 81 in a manner like the previously described embodiments and in this embodiment the adjusting shim 81 is provided with a blind bore 201 for location purposes. In this embodiment, however, the hardened insert element, indicated generally by the reference numeral 251, has a cylindrical portion 252 in which surface discontinuities 253 are formed. Above the cylindrical portion 252 there is provided a larger diameter headed portion 254 which acts as a pressing area to cause the metal deformation "a" into the discontinuities 253 for interlocking. In this embodiment, pressing is done from the head of the tappet body element 77 and a mandrel is provided with a bore that will clear the cylindrical portion 252 and engage the tappet lower surface raised portion 84 for backup.

Figure 22:
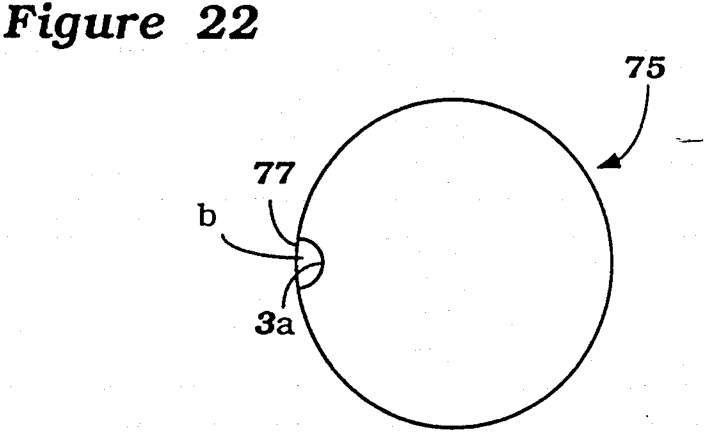
FIG. 22 is a top plan view of this embodiment.
Figure 21:
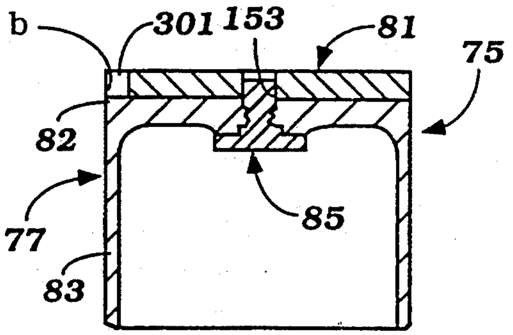
FIG. 21 is a cross-sectional view, in part similar to FIGS. 17, 19 and 20, and shows yet another embodiment of the invention.

FIGS. 21 and 22 show another embodiment of the invention which is basically the same as the embodiment of FIGS. 16–18. In this embodiment, however, the adjusting shim 81 has an outer diameter which is substantially the same as the outer diameter portion 83 of the tappet body element 77. However, the shim 81 is provided with an arcuate notch 301 that leaves an opening b to permit the insertion of a tool for depressing the tappet 75 for replacement and shim adjusting purposes.

Figure 23:
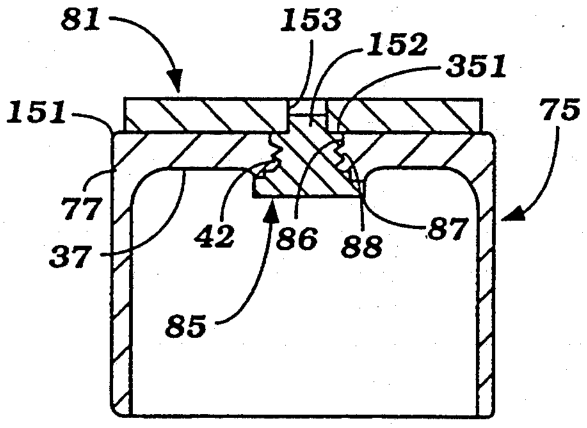
FIG. 23 is a cross-sectional view, in part similar to FIGS. 17,19, 20 and 21, and shows yet another embodiment of the invention.

FIG. 23 shows another embodiment of the invention which is generally similar to the embodiments of FIGS. 16–18, 19, 20, 21 and 22. However, in all of the previously described embodiments mentioned, the valve opening forces have been transferred directly from the adjusting shim 81 to the body element 77 and none of the loads have been taken by the hardened insert element 85. FIG. 23 shows an embodiment wherein part of the loads are transmitted from the adjusting shim 81 to the lifter body element 77 through the hardened insert element. Since the construction is similar to that of FIGS. 16–18, the same reference numerals have been applied to elements which are common. In this embodiment, the cylindrical portion 87 of the insert element 85 extends up to the upper portion of the tappet body element surface 151 and forms a shoulder 351 which is coextensive with it and against which the adjusting shim 81 reacts.

It should be readily apparent from the foregoing description that the described embodiments of the invention provide extremely effective lightweight valve actuating tappets in which the hardened insert wear element is rigidly held in position but which can be easily manufactured and assembled. Of course, the foregoing description is that of preferred embodiments of the invention and various changes and modifications may be made without departing from the spirit and scope of the invention, as defined by the appended claims.

I claim:

1. A method of making a tappet assembly for transmitting motion between an actuating member and a valve stem member in a reciprocating machine, said method comprising the steps of forming a main body element having a cylindrical surface adapted to be supported for reciprocation in a bore of a component of said machine and a transversely extending surface having an opening therein, forming an engaging element having a first portion complementary to said opening and a second portion of larger effective cross sectional area, forming on said engaging element first portion a surface discontinuity, inserting said first portion into said opening of said main body element with said second portion in engagement with said transversely extending surface and plastically deforming a portion of the main body element into said surface discontinuity of said first portion by forcing said second portion into said transversely extending surface for interlocking said elements to each other.

2. A method as set forth in claim 1 wherein the main body element is formed of a lightweight material and the engaging element is formed from a harder, more wear resistant material.

3. A method as set forth in claim 2 wherein the surface discontinuity comprises a circumferential groove.

4. A method as set forth in claim 2 wherein the first portion and the opening comprise cylindrical surfaces.

5. A method as set forth in claim 4 wherein the second portion of the engaging element is pressed into flush engagement with the transversely extending surface of the main body element.

6. A method as set forth in claim 4 wherein the engaging element engages the valve stem and the first portion extends through the body element and beyond an outer surface thereof for receiving an adjusting shim and for providing transverse location for the adjusting shim.

7. A method as set forth in claim 6 wherein the adjusting shim has a cylindrical opening receiving the extending portion of the engaging element.

8. A method as set forth in claim 7 wherein the bore in the adjusting shim is a blind bore.

* * * * *